3,025,187
FIBROUS BATTING MATERIALS
Angus Smith Bell, Leonard Krause, and George Hammerschmidt, London, England, assignors to British Celanese Limited, a corporation of Great Britain
Filed Feb. 21, 1957, Ser. No. 641,638
Claims priority, application Great Britain Feb. 22, 1956
3 Claims. (Cl. 117—140)

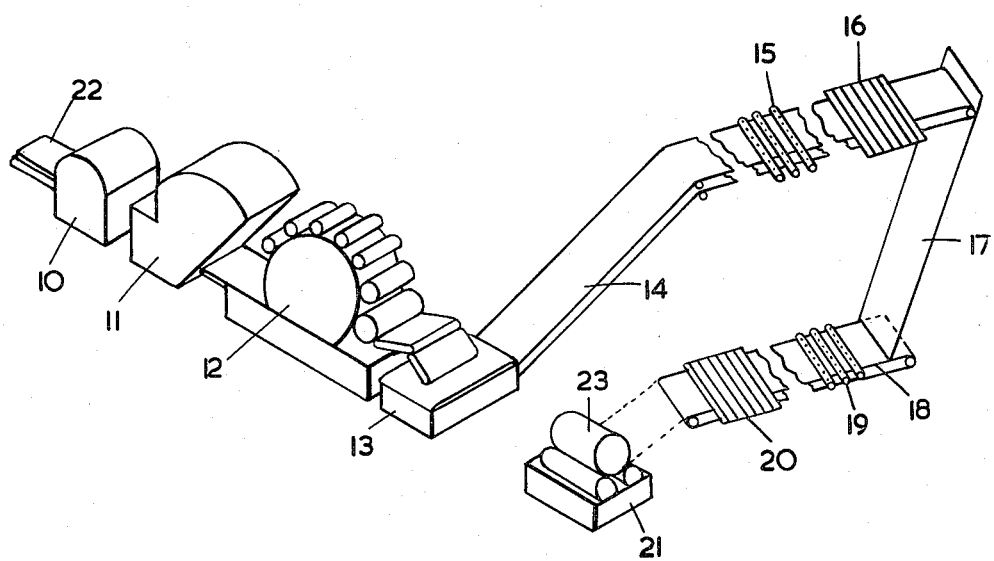

This invention relates to fibrous materials and in particular to voluminous materials, e.g. battings, composed of matted unspun staple fibres. By "unspun" is meant that the fibres are not twisted into yarns.

Fibrous materials of the kind referred to find many uses, e.g. as filling-material for quilts, as lining material for garments, as heat-insulating material for other purposes, e.g. in refrigerators, as packing material, as filter material and as absorbent material for surgical dressings and the like. In materials of the kind referred to the strength and cohesion are commonly less than could be desired to enable the material to be handled without damage and there is a tendency for fibres to stray off the surface. As indicated by way of example below, various methods have been proposed to improve the materials in these respects.

U.S. Patent No. 2,321,108 describes a process for the production of felt-like materials which comprises subjecting a mixture of staple fibres of a thermoplastic cellulose derivative and non-thermoplastic fibres to the action of heat and pressure so as to cause the thermoplastic fibres to soften and thereby to bind together the mixture of fibres into a fibrous web, the conditions of heat and pressure being such that the thermoplastic cellulose derivative remains substantially completely in the fibrous form. In the specification carding to produce a fleece-like web, and the incorporation of plasticizers in the fibres are described. In the example, the carded web is subjected to a pressure of 1000 p.s.i. at 300° F.

British Patent No. 608,753 describes a process comprising the preparation of batting having a basis of staple fibres, said process comprising forming a layer of interlaced and matted staple fibres of which a substantial proportion are thermoplastic, and forming a skin on both sides of said layer by causing the thermoplastic fibres at or near the surfaces of the layer to become adhesive and to stick one to another solely by the action of heat and pressure and/or of a solvent or softening agent for the material of which the thermoplastic fibres consist, while leaving unaffected the thermoplastic fibres in the body of the layer.

According to U.S. Patent No. 2,610,384 a skin is formed on a loose mass of fibrous material containing a substantial proportion of thermoplastic fibres by exposing the mass of fibrous material to radiant heat while the mass is held under light pressure by a metal gauze through which the radiant heat is applied, and terminating the exposure when the thermoplastic fibres at and near the heated surface of the mass have been rendered adhesive thereby and before the thermoplastic fibres within the mass become adhesive.

U.S. Patent No. 2,497,117 describes a process for the manufacture of coherent batting, which comprises wetting with water alone a layer of interlaced and matted staple fibres, some or all of which are thermoplastic, and forming a skin on both sides of the said layer by causing the thermoplastic fibres at or near the surfaces of the said layer to become adhesive and to stick to one another by the action of heat and pressure, while leaving unaffected the thermoplastic fibres in the body of the layer.

The present invention provides a method of improving the strength and cohesion of batting and other voluminous materials composed of matted unspun staple fibres, which does not necessitate coalescence of thermoplastic fibres in the material or subjection of the materials to pressure or to temperatures in the neighbourhood of, or above, the softening point of the material of which they are composed or the application of solvents.

According to the present invention the fibrous material is sprayed with an aqueous dispersion of polyvinyl acetate or other thermoplastic polymer of an olefinically unsaturated compound and the aqueous medium is then evaporated from the material. The temperature at which evaporation is effected is preferably below the heat-softening point of the substance of which the fibre is composed and may be below the fusion temperature of the polymer of the dispersion.

Preferably, the batting or like fibrous treated material is composed of or contains fibres of cellulose acetate. The fibrous material may, however, be composed of or contain other fibres having a basis of an organic polymer, e.g. regenerated cellulose, vinyl-type polymers such as polyvinyl chloride-acetate, vinylidine chloride-vinyl chloride copolymers, vinyl chloride-acrylonitrile copolymers, vinylidine chloride-acrylonitrile copolymers and other polymers of acrylonitrile including homopolymers and polymers containing small proportions of vinyl pyridine, acrylamide and other components adapted to improve the dye affinity of polyacrylonitrile, fibre-forming polyamides, e.g. nylon 6, nylon 66, or nylon 610 and fibre-forming polyesters such as polyethylene terephthalate. Battings composed of or containing natural fibres, e.g. cotton, linen, silk or wool, may also be treated according to the invention.

Cellulose acetate in fibres of the batting may be of low, medium or high acetyl value, e.g. of acetyl value from 52 to 54%, or from 54% to 58% or from 58 to 62.5%, calculated as combined acetic acid.

The batting may be made by various methods. Excellent battings for use in the process of the invention can be made, for example, by a mechanical carding process including a final cross-lapping step in which the lap from the carding machine is folded on to a conveyor travelling at right angles to the direction of passage through the carder so building up a batting of the required thickness from a number of layers of lapping and at the same time securing a more nearly random arrangement of fibres. Another method is to deposit the fibres from an air stream on a foraminous surface, again securing a substantially random arrangement of fibres in the batting. Or a combination of mechanical with pneumatic carding can be employed.

By the methods referred to above extremely voluminous battings have been made, e.g. battings in which the apparent density is less than 2 lbs./cu. ft., e.g. 0.25 to 1 lb./cu. ft. Such battings are particularly suitable for treatment according to the invention but battings of higher density, e.g. 2 to 5 lbs./cu. ft. can also be treated with useful results.

As indicated above, the thermoplastic polymer is deposited on the batting or the like from aqueous dispersion by spraying. This is an important feature of the invention. It enables products to be obtained having properties, including a very desirable degree of voluminosity and elasticity, not readily obtainable by other methods. The dispersions used are of the kind commonly termed "stable dispersions" or "stable emulsions." (Dispersion is the more accurate term but both terms are used in the industry.) "Stable" here means that the dispersions can be kept for periods of at least one month without precipitation. (Actually the stable polyvinyl acetate dispersions of commerce usually remain stable for six months or more.) The stable dispersions commercially available are commonly of concentration between 50 and 60% and when using them dilution with water may therefore be necessary to provide a dispersion suitable for spraying.

In describing the composition of the dispersions all percentages are based on the total weight of the dispersion unless otherwise stated.

Stable emulsions of the kind referred to above containing 45 to 60% solids, mostly polymer, e.g. 40 to 55% polymer, have now been on the market for many years and there is a large body of published information as to their preparation and properties. In this connection we would refer for instance to: Chemie and Technologie der Kunststoffe, by R. Houwink, 1942, vol. 2, pp. 161–2; Revue Generale de Caoutchouc, vol. 20 (1943), pp. 29–35; German Plastics Practice, by J. M. De Bell, W. C. Goggin and W. E. Gloor, 1946, pp. 103–111; F.I.A.T. 1102, pp. 4–6; Vinyl and Related Polymers, by C. E. Schildknecht, 1952, pp. 333–335; and British Patents Nos. 437,446, 466,173, 475,162, 511,036, 568,884, 577,861, 615,725, 641,653, 648,001 and 655,734.

In the stable dispersions, to assist in obtaining the desired stability against precipitation, there is usually present a suitable proportion, e.g. 1 to 3%, of a protective colloid, e.g. polyvinyl alcohol (preferably retaining a minor proportion of acetate groups, or slightly acetalized), copolymers of an alkali metal methacrylate with a minor proportion of methylmethacrylate, or water-soluble copolymers of vinyl acetate. Many other protective colloids are available, e.g. copolymers of styrene with soluble salts of maleic acid, methyl cellulose, hydroxyethyl cellulose, alkali-metal carboxy methyl celluloses, water-soluble colloidal carbohydrates, and polyvinyl pyrrolidone and water-soluble pyrrolidone copolymers. To ensure the desired stability the protective colloid must be selected with due regard to the other constituents of the dispersion.

In addition to the protective colloid a small proportion, e.g. 0.2 to 1%, of a wetting agent is commonly present in the dispersion with a view to controlling the particle size and assisting in stabilizing the dispersion against coagulation. The wetting agents employed are usually of the anionic kind, e.g. dioctyl sodium sulphosuccinate, sodium dodecyl benzene, sulphonate or sodium alkyl naphthalene sulphonate or of the non-ionic kind, e.g. alkyl phenyl polyethylene glycol ethers, polypropylene glycols, ethylene oxide adducts of cetyl and/or oleyl alcohols, polyethylene glycol oleates, and propylene oxide-ethylene oxide copolymers. For the purpose of the present invention it is preferred that any wetting agent present should be of the non-ionic kind.

Polymers that can readily be obtained in the form of concentrated stable aqueous dispersions without the use of protective colloids or wetting agents can be made by copolymerising vinyl acetate or like ethylenically unsaturated ester with a small proportion of a vinyl compound containing a solubilising saline group, e.g. an alkali-metal sulphonate group. The preparation of copolymers of this kind by copolymerising vinyl acetate with a small proportion of an alkali-metal salt of vinyl sulphonate is described in U.S. Patent No. 2,300,920.

The polymer may be unplasticised or plasticised internally or externally. Internal plasticisation is present in copolymers of vinyl acetate with a small proportion of a suitable comonomer, e.g. an alkyl ester of maleic, fumaric or itaconic acid, or an isopropenyl ester. External plasticisation may be achieved by incorporation in the dispersion, or in the reaction mixture from which it is formed by polymerisation, of a suitable plasticiser for the polymer. For polyvinyl acetate and copolymers of vinyl acetate with small proportions of a comonomer, dibutyl phthalate has been found generally satisfactory, alone or in admixture with other compatible plasticisers, especially di-(methylcyclohexyl) phthalate and triethylene glycol di-2-ethyl butyrate. For polyvinyl acetate a proportion of plasticiser amounting to 10 to 30%, especially 15 to 25%, of the weight of the polymer will generally be found suitable.

The spraying is preferably effected by passing the batting continuously across a spray produced by a series of spray nozzles fed with the aqueous dispersion in such a way as to produce a coating of density which is substantially uniform across the width of the material. The nozzles may be stationary or may be traversed in an appropriate manner. The drying of the batting to which the aqueous dispersion has been applied may be effected at a temperature below that at which the polymer begins to melt. Operations directed to spreading the coating and forming it into a continuous layer are unnecessary and preferably avoided. Drying may, for example, be effected at room temperatures, e.g. 15–30° C. or at higher temperatures, e.g. 30–50 or 60° C.

An advantage of the method described for applying the polymer is that it permits of very fine control of the amount deposited, and that the desired effect can be obtained by the application of very small proportions of polymer relative to the weight of fibrous material. In consequence the desired effects can be achieved without substantially affecting the appearance or handle of the material.

It is preferred to employ as the polymer polyvinyl acetate but various other polymers (some of which would have an undesirable effect on the handle or appearance of the material if used in large amounts and which would be ineffective in small amounts applied by other methods) can be employed with advantage by the method of the invention. The polymer used should be water-insoluble, relatively soft and non-crystalline without being liquid at ordinary temperatures and non-rubbery. Examples of such polymers are: polyvinyl acetate, the copolymers of vinyl acetate and of isopropenyl acetate with maleic esters, with other vinyl esters, e.g. vinyl benzoate, and with vinyl chloride; polymerised acrylic and methacrylic esters, e.g. polyethyl acrylate, polymethyl methacrylate, polyethyl methacrylate, polybutylacrylate, polybutyl methacrylate, polyisobutyl acrylate, polyisobutyl methacrylate and copolymers of acrylic and methacrylic esters with vinyl esters, and with vinyl chloride, acrylonitrile, methacrylonitrile and vinyl ethers, and polyvinyl acetals. Mention may also be made of polyvinyl chloride, copolymers of vinyl chloride with vinylidine chloride and with acrylonitrile, and copolymers of vinylidine chloride with acrylonitrile. The aqueous dispersion applied may contain plasticiser for the polymer.

The accompanying diagrammatic drawing shows, by way of example, in perspective, an apparatus for making batting and treating it according to the process of the invention.

The drawing shows a pickering machine 10 for opening up the bales of fibre, followed by an auto-feed arranged to receive the material from the pickering machine and transfer it at a uniform rate to a double doffer Garnett carding machine 12. This is arranged to feed the lap produced to a crossing lap folder 13 where a batting of the desired thickness is built up from numerous thicknesses of the lap. The lap folder comprises a conveyor adapted to be run, at a speed that can be varied, at right angles to the direction of delivery from the carder, and means for folding the lap from the carder on to this conveyor. A conveyor 14 is arranged to carry the batting continuously from the lap folder under sprays 15, and then under steam-heating pipes 16 (or other form of radiant heater). A guide plate 17 is arranged to guide the batting discharged from the end of the conveyor 14 on to the upper surface of a second conveyor 18 travelling in the opposite direction to 14 so that what was the under surface of the batting on the conveyor 14 becomes the upper surface on the conveyor 17. The conveyor 17 passes first under sprays 19 and then under steam-heating pipes 20. The sprays 15 and 19 comprise pipes extending across the whole width of the conveyor belts and provided with downwardly extending atomizing nozzles adapted to be operated by air pressure. Means (not shown) are provided for supplying to the sprays the required aqueous polymer dispersion and air under suitable pressure (e.g. 40–50 lbs./sq. in). A winding reel 21 is provided to receive the batting discharged from the end of the conveyor 18 and to wind this loosely at constant speed into a roll.

In operation the fibre 22, as received, is fed into the pickering machine 10, passes thence to the auto-feed 11 and is delivered from this to the carding machine 12. Here it is formed into a lap which is delivered to the lap folder 13 where it is built up to form the desired batting. The batting is then carried away by the conveyor 14, and its upper surface is sprayed with the polymer dispersion while passing under the sprays 15. The batting is then dried by passage beneath the steam-heating pipes 16 and is discharged from the conveyor 14 and guided on to the conveyor 18 in such a way that the unsprayed surface is now uppermost. This surface is now sprayed with the dispersion while passing beneath the sprays 19. The batting is then dried by passage beneath heating coils 20 and discharged from the conveyor 18 to the winding reel 21. Here it is wound up loosely at constant speed into a roll 23.

The following examples illustrate the invention.

Example 1

A batting 36" wide, about ¾" thick and of weight about 4 oz./yd. (about 7.1 oz./cu. ft), was formed from cellulose acetate staple fibre of filament denier 3 and average staple length 4".

An aqueous dispersion of unplasticised polyvinyl acetate of concentration 57% by weight (sold by Dunlop Special Products Limited as "Polimul 595") was diluted with half its volume of water.

In apparatus of the kind described above the batting was sprayed on each surface with the diluted dispersion, the dry weight of polymer applied to each surface being 0.15 oz./yd. The batting was dried after each of the two spraying operations, at a temperature of approximately 50° C. and was wound at constant speed into a loose roll.

The treatment was found to have increased the strength and cohesion of the batting, at the same time reducing the tendency of fibres to stray from the surface but had not substantially affected its handle, appearance or elasticity.

Example 2

The process was carried out as in Example 1 but employing as the concentrated dispersion to be diluted, an aqueous dispersion containing 55% of polyvinyl acetate and as protective colloid 1.5% of a hydrolysed polyvinyl acetate containing 20–24% of residual acetate groups.

Example 3

The process was carried out as in Example 2 but substituting for the hydrolysed polyvinyl acetate a copolymer containing 98% of combined sodium methacrylate and 2% of combined methyl methacrylate.

Example 4

The process was carried out as in Example 1 but employing as the concentrated dispersion to be diluted, an aqueous dispersion containing 44% of polyvinyl acetate and 11% of dibutyl phthalate.

Example 5

The process was carried out as in Example 2 except that the concentrated dispersion to be diluted contained in addition 0.05% of polyethylene glycol 1500 monooleate as wetting agent.

Example 6

The process was carried out as in Example 5 except that the wetting agent employed was an adduct of cetyl and oleyl alcohols with 20–30 moles of ethylene oxide.

Example 7

The process was carried out as in Example 1 but employing as the concentraed emulsion to be diluted a 55% aqueous emulsion of an internally plasticised vinyl acetate polymer sold as "Polimul 637" by Dunlop Special Products Limited.

Examples 8 to 12

In these examples the processes were carried out as in Examples 1, 2, 3, 5 and 6, respectively, except that: the batting was formed from equal weights of cellulose acetate staple fibre of the kind specified in Example 1 and wool fibre of 64s merino; the batting was approximately 1" thick, and weighed about 4.5 oz./yd. (about 6 oz./cu. ft.) and it received a coating of 0.21 oz./yd. dry weight on each side.

Examples 13 to 17

In these examples the processes were carried out as in Examples 1, 2, 3, 5 and 6, respectively, except that: the batting was formed from equal weights of cellulose acetate staple fibre of the kind specified in Example 1 and cotton fibre of staple length 1½"; the batting was 1" thick and weighed about 4 oz./yd. (about 5.3 oz./cu. ft.), and each side received a coating of dry weight 0.28 oz./yd.

In the process as described in the foregoing examples the coating of vinyl polymer was concentrated on or near the surface of the material and did not penetrate far below the surface. According to a modification of the process, spraying is effected at the cross-lapping folder in the process of cross-lapping so that each layer of lapping employed in building up the batting is coated. In this way, considerably greater strength is imparted to the batting at some sacrifice in voluminosity. The strength of the battings can also be further improved by subjecting them to temperatures sufficient to fuse the applied polymer, which for this purpose is preferably plasticised either internally or externally. During the fusion the batting may be compressed. This increases the strength but at the sacrifice of a considerable degree of voluminosity.

The treated battings of the invention may be bonded to surfaces of various materials. Attractive products have been obtained, for instance, by bonding these battings to the surfaces of webs such as fabrics, paper, thermoplastic film (e.g. of cellulose acetate or of any of the fibre-forming polymers referred to above in connection with the nature of the batting) or of non-thermoplastic foils, e.g. foils of regenerated cellulose. A layer of the treated batting may also be sandwiched between two layers of a fabric, paper, film or other web. In such bonding operations it is of advantage for the applied polymer to be plasticised and a plasticiser for the material of the batting may also be present when this is plasticisable.

Instead of battings bodies of matted unspun fibre in other forms, e.g. cylindrical bodies of such material, can be treated.

Having described our invention, what we desire to secure by Letters Patent is:

1. Process for making a material suitable for use as a filling for quilts, which comprises spraying both sides of a batting of randomly arranged matted, unspun cellulose acetate staple fibres with an aqueous dispersion of polyvinyl acetate to deposit about 7.5 to 14% of solids based on the weight of the batting and drying the sprayed material at a temperature below that at which the polyvinyl acetate becomes sticky, without compressing the batting, the batting employed being of densiy 0.05 to 1 pound per cubic foot, the concentration of polyvinyl acetate in the dispersion lying within the range 20 to 30% by weight and the amount of polyvinyl acetate applied to each surface ranging from 0.15 to 0.3 ounce per square yard.

2. Process according to claim 1, wherein the polyvinyl acetate is plasticised.

3. Process according to claim 1, wherein the polyvinyl acetate is plasticised with 15 to 25% of its weight of dibutyl phthalate.

References Cited in the file of this patent

UNITED STATES PATENTS

| | | |
|---|---|---|
| 2,497,117 | Dreyfus | Feb. 14, 1950 |
| 2,639,759 | Simison | May 26, 1953 |
| 2,719,803 | Nottebohm | Oct. 4, 1955 |
| 2,784,132 | Maisel | Mar. 5, 1957 |